US008645721B2

(12) United States Patent
Ito

(10) Patent No.: US 8,645,721 B2
(45) Date of Patent: Feb. 4, 2014

(54) SYSTEM FOR CONTROLLING APPARATUS DRIVEN BY BATTERY

(75) Inventor: Kuniaki Ito, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 13/051,189

(22) Filed: Mar. 18, 2011

(65) Prior Publication Data

US 2011/0320830 A1   Dec. 29, 2011

(30) Foreign Application Priority Data

Jun. 25, 2010   (JP) ................................. 2010-144649

(51) Int. Cl.
*G06F 1/00*   (2006.01)

(52) U.S. Cl.
USPC ............ 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| 5,027,006 | A |   | 6/1991 | Queinnec et al. | |
| 5,061,579 | A | * | 10/1991 | Ishimoto | 429/96 |
| 5,269,718 | A | * | 12/1993 | Reed | 446/456 |
| 5,562,522 | A | * | 10/1996 | Richno | 446/444 |
| 5,727,986 | A | * | 3/1998 | Stubenfoll et al. | 446/437 |
| 2002/0132556 | A1 | * | 9/2002 | So | 446/456 |
| 2004/0116043 | A1 | * | 6/2004 | Hui | 446/427 |

FOREIGN PATENT DOCUMENTS

| JP | 61-239796 A | 10/1986 |
| JP | 02-213771 A | 8/1990 |
| JP | 8-132992 | 5/1996 |

OTHER PUBLICATIONS

Japanese Office Action issued in corresponding JP Application No. 2010-144649 on Nov. 27, 2013, along with English translation.

* cited by examiner

*Primary Examiner* — M Elamin

(74) *Attorney, Agent, or Firm* — White & Case LLP

(57) ABSTRACT

In one embodiment, a system for controlling an apparatus driven by a battery, the system operating by the battery, includes a computer to control the apparatus, a control signal circuit to send a signal from the computer to the apparatus so as to control the apparatus, and a nonvolatile memory circuit to store an operating state of the computer. The operating state includes a first operating state and a second operating state, the computer sets the apparatus to a low load state in accordance with the operating state and controls the apparatus when the computer is reset for shutdown due to a decrease of the residual quantity of the battery and is restarted for power-on.

17 Claims, 7 Drawing Sheets

| APPARATUS | SERIAL NO. | POWER CONSUMPUTION | | PRIORITY |
| --- | --- | --- | --- | --- |
| | | NORMAL OPERATION | LOW POWER OPERATINO | |
| MOTOR | #2 | En2 | EI2 | 2 |
| CAMERA | #1 | En1 | EI1 | 1 |
| AUDIO I/O DEVICE | #3 | En3 | EI3 | 3 |

| CASE | SELECT CONDITION | NORMAL OPERATION APPARATUS | | |
| --- | --- | --- | --- | --- |
| 1 | $Eb > En1 + EI2 + EI3$ | #1 | | |
| 2 | $Eb > En1 + En2 + EI3$ | #1 | #2 | |
| 3 | $Eb > En1 + EI2 + En3$ | #1 | | #3 |
| 4 | $Eb > EI1 + En2 + EI3$ | | #2 | |
| 5 | $Eb > EI1 + En2 + En3$ | | #2 | #3 |
| 6 | $Eb > EI1 + EI2 + En3$ | | | #3 |

FIG. 5B

SYSTEM FOR CONTROLLING APPARATUS DRIVEN BY BATTERY

CROSS REFERENCE TO RELATED APPLICATION

This application is based upon and claims the benefit of priority from the prior Japanese Patent Application No. 2010-144649, filed on Jun. 25, 2010, the entire contents of which are incorporated herein by reference.

FIELD

Embodiments described herein relate generally to a system for controlling an apparatus driven by a battery.

BACKGROUND

In apparatuses which are driven by a battery, there is an apparatus controlled by a system which operates by the same battery. The system controls the apparatus which is driven by the battery using a computer.

When a residual quantity of a battery decreases, a voltage of the battery decreases by the own internal voltage drop. In case that the voltage of the battery becomes not more than the operation guarantee voltage, the computer is automatically reset for shutdown and then restarted for power-on.

When the computer is restarted, the apparatus which is driven by the battery is initialized. Usually, when the system is reset, as the power consumption of the system is sufficiently small, the battery voltage is restored. But, each time the system and the apparatus which is driven by the battery are initialized, the power consumption gradually increases. In case that the power consumption of the apparatus which is driven by the battery is sufficiently larger than the power consumption of the system, much power is consumed for the initialization of the apparatus in this time, and thereby the battery voltage decreases.

As a result, there is a problem that the computer falls into a state of repeating the reset and restart, and thereby it becomes impossible to control the apparatus which is driven by the battery. In addition, a problem and so on might be generated that the operation of the apparatus which is driven by the battery is disturbed, and thereby the degradation of the battery is accelerated.

For the reason, in conventional systems, there is a system which is provided a monitor circuit of the battery voltage so as to set the apparatus which is driven by the battery to a safe operation, in case that the voltage of the battery decreases below a reference value.

In addition, there is a system which is provided with a backup battery so as to continue to control the apparatus which is driven by the battery by switching to the backup battery, in case that the voltage of the battery decreases below a reference value.

However, the increase in the size of the system and increase in the power consumption of the system are brought, so that there is a problem that it is difficult to apply these systems to an apparatus in which miniaturization and low power consumption are required, such as a mobile device.

BRIEF DESCRIPTION OF THE DRAWINGS

FIGS. 5A and 5B are look-up tables showing the relation of a power consumption, a priority and an operation mode with respect to the plurality of apparatuses driven by the battery according to the second embodiment;

DETAILED DESCRIPTION

Figure 1:
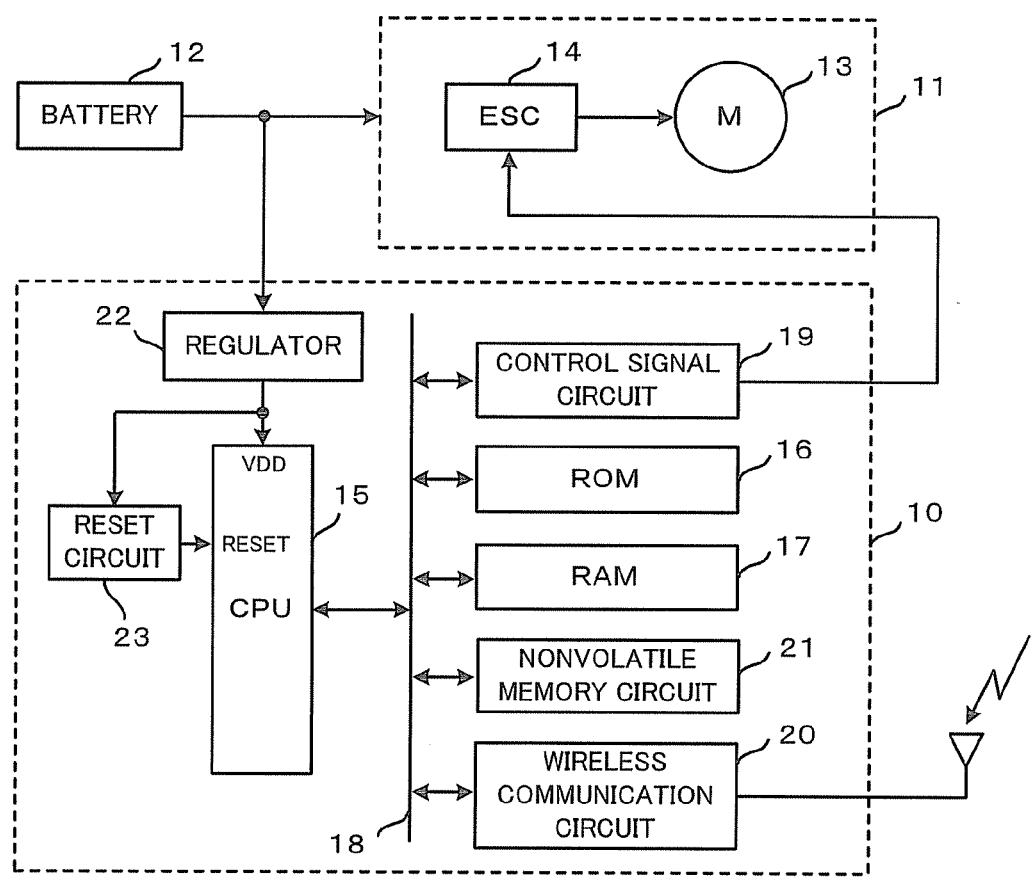
FIG. 1 is a block diagram showing a construction of a system for controlling an apparatus driven by a battery according to a first embodiment.

In one embodiment, a system for controlling an apparatus driven by a battery, the system operating by the battery, includes a computer to control the apparatus, a control signal circuit to send a signal from the computer to the apparatus so as to control the apparatus, and a nonvolatile memory circuit to store an operating state of the computer. The operating state includes a first operating state and a second operating state. The computer sets the apparatus to a low load state in accordance with the operating state and controls the apparatus when the computer is reset for shutdown due to a decrease of the residual quantity of the battery and is restarted for power-on.

Hereinafter, the embodiments will be described with reference to the drawings. In the drawings, same reference characters denote the same or similar portions.

First Embodiment

Figure 2:
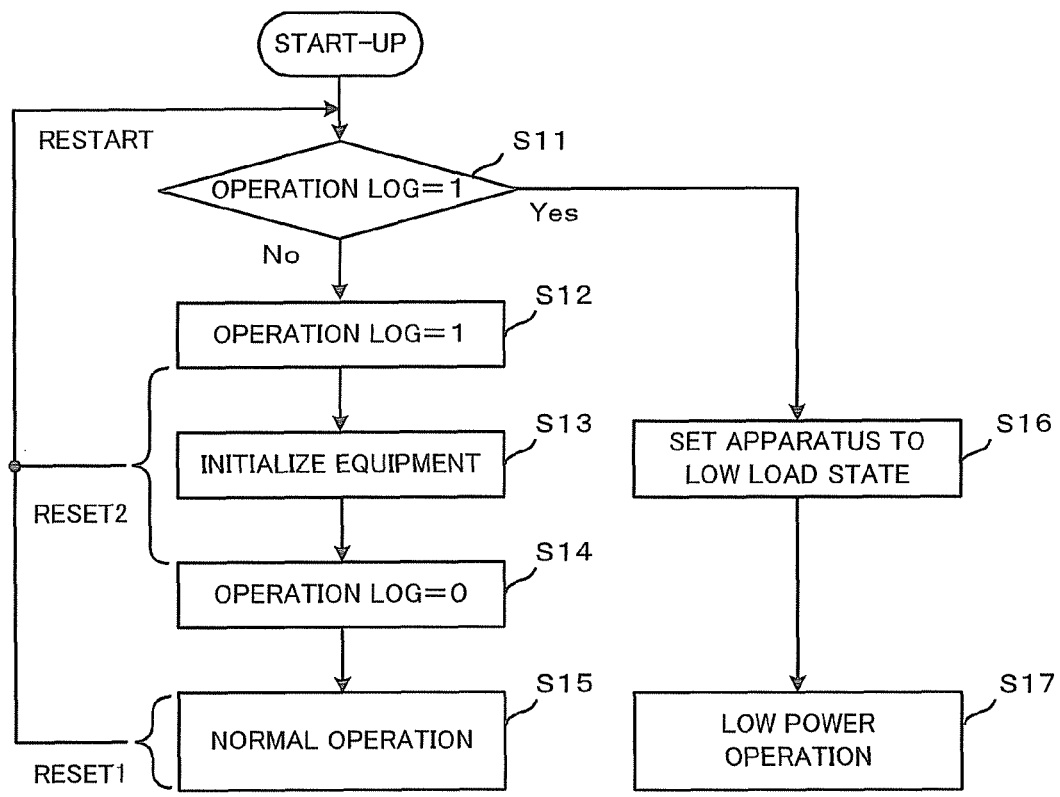
FIG. 2 is a flow chart showing an operation of the system for controlling the apparatus driven by the battery according to the first embodiment.
Figure 3:
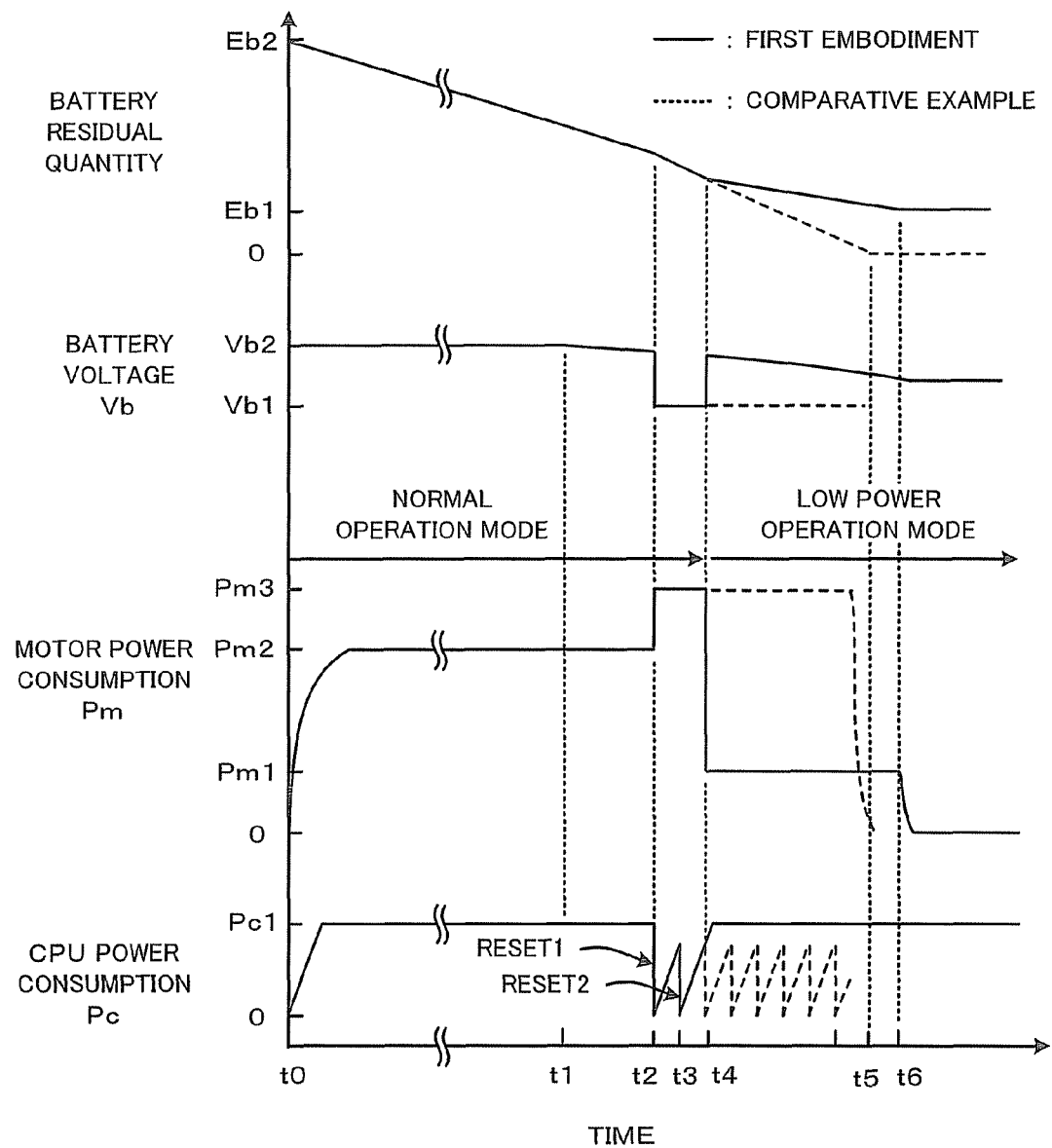
FIG. 3 is a view showing a performance of the system for controlling the apparatus driven by the battery in contrast with a comparative example according to the first embodiment.

A system for controlling a battery driven apparatus of the embodiment will be described with reference to FIG. 1 to FIG. 3. FIG. 1 is a block diagram showing a construction of a system, FIG. 2 is a flow chart showing an operation of the system, and FIG. 3 is a view showing time variations in a residual quantity of the battery, a power consumption of the apparatus, and a power consumption of the system, in contrast with a comparative example.

As shown in FIG. 1, a system 10 of the embodiment and an apparatus 11 which is driven by a battery are connected in parallel to a single battery 12. That is, the apparatus 11 is driven by the battery 12, and the system 10 operates by the battery 12.

The apparatus 11 is a toy radio control car, for example (Hereinafter, written also as an RC car 11). The battery 12 is a primary battery or a secondary battery with a voltage of 6V, for example. The battery 12 and the system 10 are mounted on the RC car 11.

The RC car 11 runs by a motor 13 rotating by the mounted battery 12, and a running speed and running direction of the RC car 11 are controlled by the mounted system 10. The control of the running speed is performed by varying the number of rotations of the motor 13 via an ESC (Electronic Speed Controller) 14. The control of the running direction is performed by operating a handle mechanism (not shown).

A driver of the RC car 11 transmits a command for the running speed and running direction to the system 10 by wireless, and thereby can drive the RC car 11 freely.

As is commonly known, the system 10 has a computer in which a CPU (Central Processing Unit) 15 to decode and execute programmed commands, the ROM (Read Only Memory) 16 to store the program, and a RAM (Random Access Memory) 17 to temporarily store the processing result are connected via a data bus 18.

The system 10 has further a control signal circuit 19, a wireless communication circuit 20 and a nonvolatile memory circuit 20 which are respectively connected to the data bus 18. The control signal circuit 19 is an interface so as to send out a command of the CPU 15 to the ESC 14 of the RC car 11. The wireless communication circuit 20 is an interface so as to communicate with the driver of the RC car 11 via a wireless LAN (Local Area Network), for example. The nonvolatile memory circuit 21 is an NAND type flash memory, for example, and memorizes an operation log indicating an operating state of the computer.

In addition, the system 10 houses a regulator 22 and a reset circuit 23. The regulator 22 is a series regulator, for example, and is connected between the battery 12 and a power source terminal of the CPU 15. The regulator 22 converts the voltage of the battery 12 to an operating voltage of the CPU 15, that is 5 V, for example, and supplies the converted voltage to the CPU 15.

The reset circuit 23 is connected to a reset terminal of the CPU 15, and connected to peripheral circuits, though not shown, such as the control signal circuit 19 and the wireless communication circuit 20 provided in the system 10. When the output voltage of the regulator 22 deviates from the rated voltage of the CPU 15, that is 5±0.5 V, for example, the reset circuit 23 outputs a reset signal to reset the CPU 15. When the CPU 15 is reset for shutdown, the CPU 15 automatically is restarted for power-on.

The above-described system 10 is configured to select an operation mode of the apparatus 11 with reference to the operation log stored in the nonvolatile memory circuit 21, each time the computer is started up, and to thereby control the operation of the apparatus 11.

Next, an operation of the system 10 will be described using FIG. 2. FIG. 2 is a flow chart showing an operation of the system 10.

As shown in FIG. 2, when the CPU 15 is started up, the CPU 15 firstly reads out the operation log stored in the nonvolatile memory circuit 21, and selects an operation mode in accordance with the read out operation log (step S11). At the time of first starting up, as the value of the operation log is set to 0 (a second state) (No, in the step S11), the value of the operation log is rewritten to 1 (a first state) (step S12).

Next, the apparatus 11 is initialized (step S13). Specifically, the number of rotations of the motor 13 is adjusted to 0 by the ESC 14, for example, and the running wheels are aligned in the direction of straight advancement by manipulating the handle. Next, the value of the operation log is rewritten to 0 (step S14).

Consequently, the apparatus 11 becomes in a normal operation mode, and the normal control becomes possible by the command of the CPU 15 (step S15). Subsequently, the driver of the RC car 11 can drive the RC car 11 freely as follows. The driver of the RC car 11 sends the command regarding both the running direction and the running speed to the system 10 by wireless so as to manipulate the handle and change the number of rotations of the motor 13 by the ESC 14.

When the RC car 11 repeats running, the residual quantity of the battery 11 begins to decrease. When the residual quantity of the battery 11 decreases, the internal resistance of the battery 12 becomes large, and thereby the voltage of the battery 12 begins to decrease by the voltage drop due to the internal resistance.

In such a state, if the RC car 11 is rapidly accelerated, for example, the load on the battery 12 rapidly increases, and the voltage of the battery 12 decreases instantaneously. As a result, when the output voltage of the regulator 22 becomes lower than the rated voltage of the CPU 15, the CPU 15, the control signal circuit 19, and the wireless communication circuit 20 are reset (reset 1) by the reset circuit 22. As a result, the load on the battery 12 is reduced, the voltage of the battery 12 recovers, and the CPU 15 can be restarted up.

At the time of first restarting the CPU 15, as the value of the operation log is 0 (No, in the step S11), the step S12 through the step S14 are executed again so as to try to set the apparatus 11 to the normal operation mode again.

During this period, the motor 13 keeps the number of rotations immediately before the CPU 15 is reset. As a result, the voltage of the battery 12 decreases during a time after the step S12 and before the step S14, and if the output voltage of the regulator 22 is kept lower than the rated voltage of the CPU 15, the CPU 15 is reset again (reset 2) and then is restarted up.

At the time of secondarily restarting the CPU 15, as the value of the operation log is 1 (Yes, in the step S11), the apparatus 11 is set to a low load state (step S16). The low load state means to operate the apparatus 11 in a low power operation mode in which the power consumption is smaller than that in the normal operation mode. That is, even if the apparatus 11 consumes power and the voltage of the battery 12 drops, a state is kept in which the output voltage of the regulator 22 does not fall below a threshold voltage of the reset circuit 23. Specifically, the number of rotations of the motor 13 is decreased than that in the normal operation mode so as to become in the low speed running state. The rotation of the motor 13 is once stopped, for example. Then the number of rotations of the motor 13 is made small so as to make a state in which the RC car 11 can run at only low speed for a short time.

As a result, the power consumption of the apparatus 11 decreases, the output voltage of the regulator 22 comes to satisfy the rated voltage of the CPU 15, without decreasing the voltage drop of the battery 12 after restarting up.

Consequently, the RC car 11 becomes controllable in the low power operation mode by the command of the CPU 15 (step S17). Subsequently, the driver of the RC car 11 can drive the RC car 11 at low speed for a short time by transmitting the command regarding the running speed and the running direction to the system 10 by wireless. The driver can guide the RC car 11 to a safe place and stop there, for example.

In this time, the CPU 15 comes to have allowance in its processing capacity. In case that the CPU 15 is provided with the low power operation mode, the CPU 15 itself transfers into the low power operation mode. It is further preferable to reduce the clock frequency, for example.

After stopping the RC car 11, it is preferable to exchange the battery in case that the battery 12 is a primary battery or to charge the battery in case that the battery 12 is a secondary battery.

FIG. 3 is a view showing time variations in the residual quantity of the battery, the power consumption of the battery driven apparatus, the power consumption of the system, in contrast with a comparative example. In the figure, continuous lines indicate the embodiment, and broken lines indicate the comparative example. In case that the embodiment and the comparative example are similar, only the continuous lines are shown.

Here, the comparative example is a system which does not have a function to set the apparatus to the low load state when the residual quantity of the battery decreases.

As shown in FIG. 3, the embodiment and the comparative example are similar from a time t0 to a time t3. It is assumed that at the time t0, the RC car 11 is set in the normal operation mode and starts running at a constant speed. In this time, a power consumption Pm of the motor 13 is Pm2, and a power consumption Pc of the CPU 15 is Pc1 (Pm2>>Pc1).

When the RC car 11 runs on, a residual quantity Eb of the battery 12 gradually decreases from Eb2. At a time t1, the residual quantity Eb of the battery 12 becomes scant, and a voltage Vb of the battery 12 gradually decreases from Vb2.

If it is assumed that the driver of the RC car 11 rapidly accelerates the RC car 11 so as to increase the speed of the RC car 11, the power consumption Pm of the motor 13 rapidly increases from Pm2 to Pm3 (Pm3>Pm2). In this time, the voltage Vb of the battery 12 instantaneously decreases down to Vb1, and when the output voltage of the regulator 22 becomes smaller than the rated voltage of the CPU 15, the CPU 15 is reset (reset 1), and then is restarted up.

The power consumption Pc of the CPU 15 once becomes 0 by the reset, but increases toward Pc1 by the restart. During this time, the motor 13 continues to rotate and the motor power consumption Pm remains Pm3. As a result, the battery voltage Vb does not recover, the CPU 15 is reset (reset 2) again at the time t3, and then is restarted up.

In this time, in the comparative example, the CPU 15 is reset (reset 2) again at a time t4 by the above-described reason, and then the reset and the restart are repeated.

During this time, as the power consumption Pm of the motor 13 remains Pm3, the residual quantity Eb of the battery 12 decreases rapidly, and when the residual quantity Eb is exhausted (at a time t5), the power consumption Pm of the motor 13 becomes 0, and the RC car 11 stops by itself.

On the other hand, in the embodiment, the CPU 15 is reset at the time t3, and when the CPU 15 is restarted it is possible to set the RC car 11 to the low power operation mode.

As a result, as the power consumption Pm of the motor 13 decreases from Pm3 to Pm1, the decrease in the residual quantity Eb of the battery 12 becomes gradual, the voltage Vb of the battery 12 recovers, and thereby the output voltage of the regulator 22 comes to satisfy the rated voltage of the CPU 15.

Accordingly, the CPU 15 can control the RC car 11 in the low power operation mode, without being reset again.

When the RC car 11 is stopped at a time t6, the power consumption Pm of the motor 13 becomes 0. The residual quantity Eb of the battery 12 becomes a constant value Eb1.

As described above, the system 10 of the embodiment can select the normal operation mode or the low power operation mode with reference to the operation log stored in the nonvolatile memory circuit 21 when the CPU 15 is started, and can control the apparatus 11 in the selected operation mode.

As a result, when the CPU 15 is reset and restarted by the decrease in the residual quantity of the battery 12, the system 10 can control the apparatus 11 in the low load state. Accordingly, the system is obtained which can properly control the battery driven apparatus even in case that the residual quantity of the battery decreases.

Consequently, circuits and so on to monitor the residual quantity of the battery so as to control the apparatus safely are not necessary. The increase in the size of the system, and the increase in the power consumption of the system are suppressed, and thereby the system can be applied to a mobile device in which the miniaturization and the small power consumption are required.

Here, the case in which the apparatus 11 is a RC car was described, but the system of the embodiment can be applied to various apparatuses which use a motor as a driving source, without being limited particularly to the RC car. In addition, the system can be applied similarly to various apparatuses which do not use a motor as a driving source.

The low load state sets the apparatus not only in the low power operation mode, but can stop the operation of the apparatus.

Second Embodiment

Figure 4:
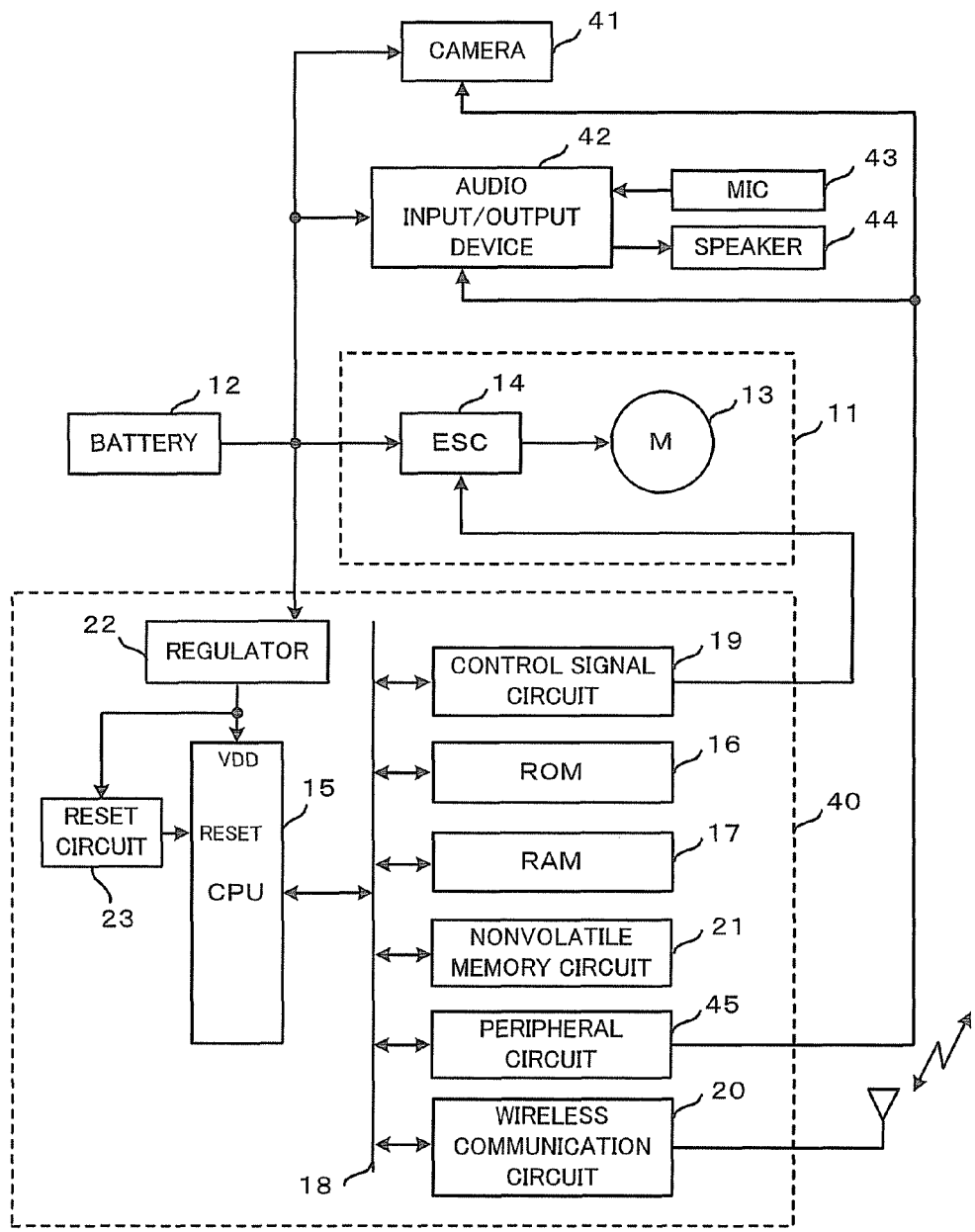
FIG. 4 is a block diagram showing a construction of a system for controlling a plurality of apparatuses driven by a battery according to a second embodiment.
Figure 6:
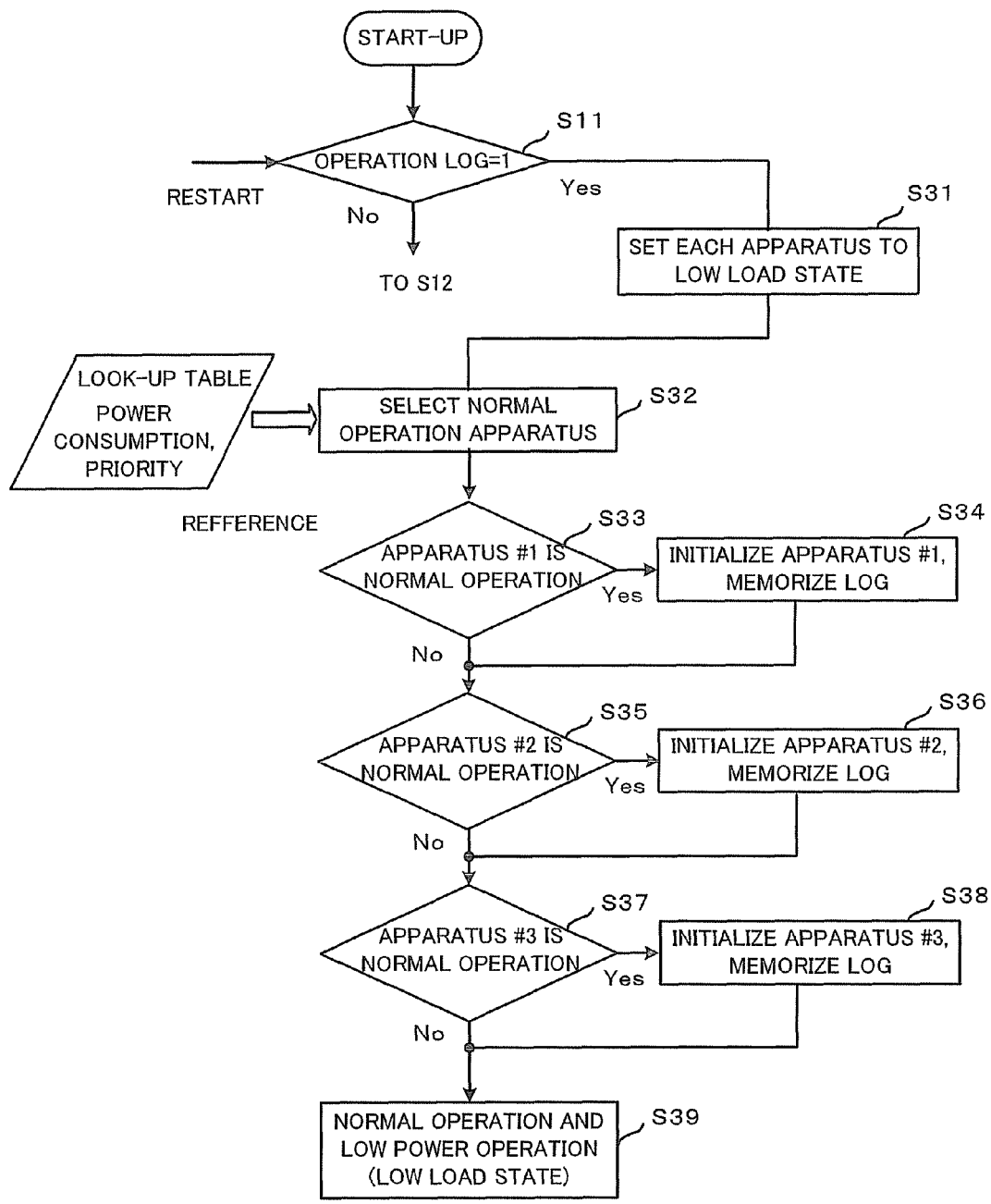
FIG. 6 is a flow chart showing an operation of the system for controlling the plurality of apparatuses driven by the battery according to the second embodiment.

A system of a second embodiment will be described with reference to FIG. 4 to FIG. 6. FIG. 4 is a block diagram showing a construction of the system of the embodiment, FIGS. 5A and 5B are look-up tables showing the relation among a power consumption, priority and an operation mode of an apparatus with respect to a plurality of apparatuses, and FIG. 6 is a flow chart showing an operation of the system.

In the embodiment, the same symbols are given to the same constituent portions as in the above-described first embodiment, thereby the description thereof will be omitted, and only different portions will be described. The embodiment is different from the first embodiment in that a plurality of apparatuses is controlled.

That is, a plurality of apparatuses 11, 41, 42 along with a system 40 is connected in parallel to the battery 12 in the embodiment, as shown in FIG. 4. That is, the apparatuses 11, 41, 42 are driven by the battery 12, and the system 40 operates by the battery 12.

The apparatus 41 is a camera (information apparatus) using a CCD (Charge Coupled Device), for example (hereinafter written also as a camera 41), and the apparatus 42 is an audio input/output device (information apparatus), for example (hereinafter written also as an audio input/output device 42). The camera 41 and the audio input/output device 42 are both mounted on the RC car 11.

Appearance around the RC car 11 can be photographed by the camera 41. A microphone 43 so as to collect sound around the RC car 11 and a speaker 44 so as to make sound around are connected to the audio input/output device 42.

A peripheral circuit 45 is connected to the data bus 18 of the system 40. The peripheral circuit 45 is an interface so as to send out a command of the CPU 15 to the camera 41 and the audio input/output device 42.

With the above-described construction, the system 40 can obtain image information from the camera 41, and can transmit the obtained image information to a driver of the RC car 11 by wireless. Similarly, the system can obtain voice information from audio input/output device 42, and can transmit the obtained voice information to the driver of the RC car 11 by wireless.

The driver of the RC car 11 can drive the RC car 11 safely from a distance where the RC car 11 is not visible, while confirming the running state of the RC car 11 based on the image information and the voice information.

The above-described system 40 is configured to select respective operation modes of the plurality of the apparatuses 11, 41, 42 with reference to the operation log stored in the nonvolatile memory circuit 21 each time the computer is started up, and to thereby control individually the respective operations of the plurality of the apparatuses 11, 41, 42.

Next, an operation of the system 40 will be described with reference to FIGS. 5A to 6. FIGS. 5A and 5B are look-up tables showing the relation among a power consumption, priority, and an operation mode of an apparatus with respect to a plurality of the apparatuses, FIG. 5A is a look-up table showing the power consumption and the priority of the apparatus, and FIG. 5B is a look-up table to describe a method of selecting the operation modes of a plurality of the apparatuses with reference to the look-up table of FIG. 5A. The look-up tables are stored in the nonvolatile memory circuit 21, for example.

As shown in FIG. 5A, a priority is previously allotted to each of the apparatuses 11, 41, 42. Here, the priority of the motor 13 of the RC car 11 is 2, the priority of the camera 41 is 1, and the priority of the audio input/output device 42 is 3.

A serial number is previously allotted to each of the apparatuses 11, 41, 42. Here, the serial number of the motor 13 of the RC car 11 is #2, the serial number of the camera 41 is #1, and the serial number of the audio input/output device 42 is #3.

Power consumptions in the normal operation mode of the apparatuses #1, #2, #3 are En1, En2, En3, respectively. Power consumptions in the low power operation mode of the apparatuses #1, #2, #3 are El1, El2, El3, respectively. It is assumed that there are the relations En2>En3>En1, and El2>El3>El1 among the power consumptions.

The residual quantity Eb of the battery 12 is smaller than a sum of the respective power consumptions En1, En2, En3 in the normal operation mode of the apparatuses #1, #2, #3, and larger than a sum of the respective power consumptions El1, El2, El3 in the low power operation mode. That is, respective power consumptions En1, En2, En3 and respective power consumptions El1, El2, El3 have a relation of En1+En2+En3>Eb>El1+El2+El3.

As a result, there may be following six cases that in each of the apparatuses #1, #2, #3, the normal operation becomes possible preferentially, as shown in FIG. 5B.

Case 1: In case that Eb>En1+El2+El3, the apparatus #1 is operable in the normal operation mode.

Case 2: In case that Eb>En1+En2+El3, the apparatuses #1, #2 are operable in the normal operation mode.

Case 3: In case that Eb>En1+El2+En3, the apparatuses #1, #3 are operable in the normal operation mode.

Case 4: In case that Eb>El1+En2+El3, the apparatus #2 is operable in the normal operation mode.

Case 5: In case that Eb>El1+En2+En3, the apparatuses #2, #3 are operable in the normal operation mode.

Case 6: In case that Eb>El1+El2+En3, the apparatus #3 is operable in the normal operation mode.

In a case which does not correspond to any from Case 1 to Case 6, each of the apparatuses #1, #2, #3 is set to the low power operation mode.

FIG. 6 is a flow chart to describe an operation of the system 40, and shows an operation after reset at the time t3 and then restarted at the time t4 as shown in FIG. 3 (after Yes, in the step S11 in FIG. 2)

As shown in FIG. 6, each of the apparatuses #1, #2, #3 is set to a low power operation mode as a rule (step S31). But in case that at least one of the apparatuses can be set to the normal operation mode with reference to the residual quantity Eb of the battery 12 and the look-up table indicating the power consumptions and the priorities of the respective apparatuses #1, #2, #3, at least one of the apparatuses which is made operate in the normal operation mode is selected as described in FIGS. 5A and 5B (step S32).

Next, whether or not the apparatus #1 is operable in the normal operation mode is judged (step S33), and in case that the apparatus #1 is operable in the normal operation mode (Yes, in the step S33), the apparatus #1 is initialized, that the apparatus #1 is in the normal operation mode is stored in the log of the nonvolatile memory circuit 21 (step S34), and then the processing goes to a step S35. On the other hand, in case that the apparatus #1 is not operable in the normal operation mode (No, in the step S33), the processing goes directly to the step S35.

Next, whether or not the apparatus #2 is operable in the normal operation mode is judged (step S35), and in case that the apparatus #2 is operable in the normal operation mode (Yes, in the step S35), the apparatus #2 is initialized, that the apparatus #2 is in the normal operation mode is stored in the log of the nonvolatile memory circuit 21 (step S36), and then the processing goes to a step S37. On the other hand, in case that the apparatus #2 is not operable in the normal operation mode (No, in the step S35), the processing goes directly to the step S37.

Next, whether or not the apparatus #3 is operable in the normal operation mode is judged (step S37), and in case that the apparatus #3 is operable in the normal operation mode (Yes, in the step S37), the apparatus #3 is initialized, that the apparatus #3 is in the normal operation mode is stored in the log of the nonvolatile memory circuit 21 (step S38), and then the processing goes to a step S39. On the other hand, in case that the apparatus #3 is not operable in the normal operation mode (No, in the step S37), the processing goes directly to the step S39.

As a result, the RC car 11 on which the camera 41 and the audio input/output device 42 are mounted becomes the low load state composed of the normal operation mode+the low power operation mode, and thereby controlling the RC car 11 in the low load state becomes possible by the command of the CPU 15 (step S39).

By operating the apparatuses in the low power operation mode in accordance with the priority of the apparatuses, in case that the residual quantity of the battery 12 decreases it is possible to control the RC car by monitoring the image from the camera 41, for example, though the audio input/output device 42 is not started.

Figure 7:
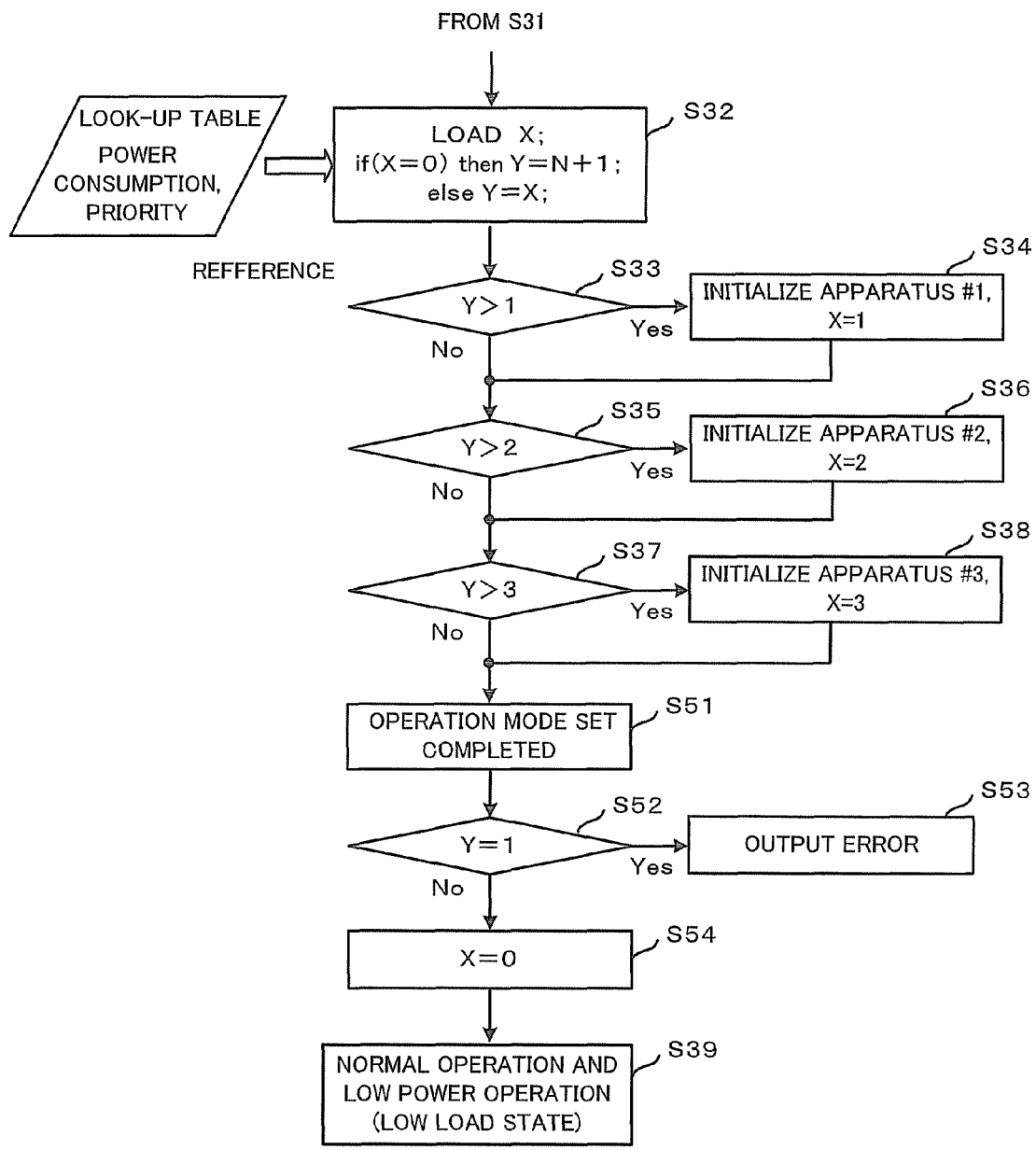
FIG. 7 is a flow chart showing an operation of the system for controlling the plurality of apparatuses driven by the battery according to the second embodiment.

FIG. 7 is a flow chart showing more specifically the flow chart shown in FIG. 6. As shown in FIG. 7, when the apparatuses which are operable in the normal operation mode are decided, the number X of the apparatuses which are made operate in the normal operation mode is read in. Next, the number X of the apparatuses which are made to operate in the normal operation mode is set to a variable Y. Here, N is the total number of the apparatuses which are connected to the battery 12 (step S32).

Next, the value of Y is checked (step S33), and in case that Y>1 (Yes, in the step S33), the apparatus #1 is initialized, the value of X is made 1 (step S34), and the processing goes to the step S35. On the other hand, except in case that Y>1 (No, in the step S33), the processing directly goes to the step S35.

Next, the value of Y is checked (step S35), and in case that Y>2 (Yes, in the step S35), the apparatus #2 is initialized, the value of X is made 2 (step S36), and the processing goes to the step S37. On the other hand, except in case that Y>2 (No, in the step S35), the processing directly goes to the step S37.

Next, the value of Y is checked (step S37), and in case that Y>3 (Yes, in the step S37), the apparatus #3 is initialized, the value of X is made 3 (step S38), and the processing goes to a step S51. On the other hand, except in cased that Y>3 (No, in the step S37), the processing directly goes to the step S51. In the step S51, the setting of the operation modes of all the apparatuses #1, #2, #3 is completed.

After the operation is started in the low load state composed of the low power operation mode and the normal operation mode, when reset again after a while, it is tried to start in the normal operation mode. In this case, the voltage drop is generated again in the middle of initialization, and after the reset the operation becomes in the low power operation mode. When the residual quantity Eb of the battery 12 gets low and all the apparatuses #1, #2, #3 become unable to be started, the value of Y becomes 1 and an error is outputted.

When the residual quantity Eb of the battery 12 gets low and all the apparatuses #1, #2, #3 become unable to be started, as the value of Y becomes 1, the value of Y is checked (step S52), and in case that Y=1 (Yes, in the step S52), an error is outputted (step S53), and all the apparatuses #1, #2, #3 stop the operations. On the other hand, except in case that Y=1 (No, in the step S52), the value of X is reset to 0 (step S54), and the processing goes to the step S39.

As described above, the system 40 of the embodiment, for the plurality of the apparatuses 11, 41, 42 which are connected to the battery 12, selects the operation modes of the plurality of the apparatuses 11, 41, 42 with reference to the look-up table indicating the power consumption and the priority and in accordance with the residual quantity Eb of the battery 12, when the CPU 15 is restarted, and can control the plurality of the apparatuses 11, 41, 42 in the selected operation modes.

As a result, there is an advantage that the plurality of the apparatuses 11, 41, 42 can be controlled by selecting the low load states variously.

Here, the case that three apparatuses are connected to the battery 12 was described, but the number of the apparatuses connected is not limited in particular. The number of the apparatuses connected can be arbitrarily selected in accordance with the capacity of the battery 12 and the power consumption of each of apparatus.

In addition, even if the apparatus which is driven by the battery 12 is one, in case that the apparatus has a plurality of functions to set the normal operation mode or the low power operation mode individually, the embodiment can be applied.

As a rule, though each of the functions is set to the low power operation mode, it is possible to set the normal operation mode in the order of descending priorities in accordance with the residual quantity of the battery, by giving priority to each function previously.

In addition, in the low power operation mode of each function, it is also thought of to shut down the power. In this time, it is thought to drop the power consumption by shutting down the power in the order of ascending priorities.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for controlling an apparatus driven by a battery, the system operating by the battery, comprising:
   a computer to control the apparatus;
   a control signal circuit to send a signal from the computer to the apparatus so as to control the apparatus; and
   a nonvolatile memory circuit to store an operating state of the computer, the operating state including a first operating state and a second operating state,
   wherein the computer sets the apparatus to a low load state in accordance with the operating state and controls the apparatus when the computer is reset for shutdown due to a decrease of the residual quantity of the battery and is restarted for power-on.

2. The system according to claim 1,
   wherein the computer reads the operating state from the nonvolatile memory circuit,
   wherein the computer sends the signal to the apparatus so as to set the apparatus to the low load state when the operating state is the first state, and
   wherein the computer rewrites the operating state to the first state, sends the signal to the apparatus so as to initialize the apparatus, and rewrites the operating state to the second state when the operating state is not the first state.

3. The system according to claim 2, wherein the reset is caused while the apparatus is operating in a normal operation mode after initialization or is caused before the operating state is rewritten to the second state after being rewritten to the first state.

4. The system according to claim 1,
   wherein the apparatus includes a normal operation mode and a low power operation mode, the power consumption of the low power operation mode being lower than that of the normal operation mode, and
   wherein the apparatus is set to the low power operation mode as the low load state.

5. The system according to claim 1, wherein the computer is connected to the battery via a regulator, the reset is performed by a reset circuit which outputs a reset signal to the computer when the output voltage of the power regulator becomes lower than a predetermined value.

6. The system according to claim 5, wherein, in the low power operation mode, the output voltage of the regulator dose not become lower than the threshold voltage of the reset circuit even if the voltage of the battery dropped due to the power consumption of the apparatus.

7. The system according to claim 1, wherein the computer receives the control command of the apparatus and controls the apparatus in accordance with the control command.

8. A system for controlling a plurality of apparatuses driven by a battery, the system operating by the battery, comprising:
   a computer to control the plurality of apparatuses;
   a control signal circuit to send a signal from the computer to the plurality of apparatuses so as to control the plurality of apparatuses; and
   a nonvolatile memory circuit to store an operating state of the computer, the operating state including a first operating state and a second operating state,
   wherein the computer sets at least one of the apparatuses to a low load state in accordance with the operating state and controls at least one of the apparatuses when the computer is reset for shutdown by a decrease of the residual quantity of the battery and is restarted for power-on.

9. The system according to claim 8,
   wherein the computer reads the operating state from the nonvolatile memory circuit,
   wherein the computer sends the signal to the apparatuses so as to set the apparatuses to the low load state, selects at least one of the apparatuses which are not set to the low load state in accordance with both the priority of the respective apparatuses and the residual quantity of the battery, and sends the signal to the selected apparatuses so as to initialize the selected apparatuses when the operational state is the first state, and
   wherein the computer rewrites the operational state to the first state, sends the signal to the apparatuses so as to initialize the apparatuses, and rewrites the operating state from the first state to the second state when the operational state is not the first state.

10. The system according to claim 9, wherein the reset is caused while the apparatus are operating in a normal operation mode after initialization, or is caused before the operating state is rewritten to the second state after being rewritten to the first state.

11. The system according to claim 8,
wherein the apparatus include a normal operation mode and a low power operation mode, the power consumption of the low power operation mode being lower than that of the normal operation mode,
wherein the apparatus are not driven or are set to the low power operation mode as the low load state.

12. The system according to claim 9,
wherein the computer selects at least one of the apparatus which are not set to the low load state in accordance with the priority of the respective apparatuses,
wherein the selection is performed within a range that an estimated power consumption is lower than the residual quantity of the battery, the estimated power consumption being a sum of first and second power consumptions, and
wherein the first power consumption is the power consumption in the low load state of the apparatuses that are set to the low load state, the second power consumption is the power consumption of the apparatuses that are not set to the low load state.

13. The system according to claim 12, wherein a look-up table that shows the priority of the respective apparatuses and the power consumption of the respective apparatuses is stored in the nonvolatile memory circuit.

14. The system according to claim 8, wherein the computer is connected to the battery via a regulator, the reset is performed by a reset circuit which outputs a reset signal to the computer when the output voltage of the power regulator becomes lower than a predetermined value.

15. The system according to claim 14, wherein, in the low power operation mode, the output voltage of the regulator dose not become lower than the threshold voltage of the reset circuit even if the voltage of the battery dropped due to the power consumption of the apparatuses.

16. The system according to claim 8, wherein the computer receives the control command of the apparatuses and controls the apparatuses in accordance with the control command.

17. The system according to claim 8, wherein an information device is included among the apparatuses, the computer receives an information from the information device and sends the information outside.

* * * * *